Patented Apr. 30, 1929.

1,710,840

UNITED STATES PATENT OFFICE.

ROBERT C. PRICE AND HUGH S. COOPER, OF CLEVELAND, OHIO, ASSIGNORS, BY MESNE ASSIGNMENTS, TO BERYLLIUM CORPORATION OF AMERICA, A CORPORATION OF NEW YORK.

PROCESS OF MAKING BERYLLIUM OXIDE.

No Drawing. Application filed December 13, 1923. Serial No. 680,546.

The invention is a process of recovering beryllium oxide from beryllium-bearing minerals, such as beryl. The invention contemplates the production of the oxide in any desired state of purity, and the production as an intermediate product of a mixture of beryllium and aluminum oxides which is useful for many purposes without preliminary separation of its components. The mixture of oxides just referred to can be obtained practically free from all other substances.

Because of its relative abundance, beryl is the preferred raw material, but other beryllium minerals may be used. Any modifications of the process made necessary by the substitution of another mineral for beryl will readily suggest themselves.

The beryl is powdered and decomposed by heating with lime. Calcium fluorid is preferably added to the mixture to promote fusion and expedite the decomposition of the beryl. Equal weights of beryl and quicklime, or of beryl, lime and calcium fluorid, have given excellent results. The mixture is heated to a bright red heat in a clay or graphite crucible, and held at this temperature for a short time until it is thoroughly fluid. It is then poured into water, dried, and finely powdered.

The powdered material is next made into a thin paste with water, and about seven parts by weight of concentrated sulphuric acid is added for each weight of beryl taken. The mixture is then heated until all water is expelled and fumes of sulphuric acid are evolved freely. This treatment dehydrates the silica, and converts the metals into sulphates.

The mass is then extracted thoroughly with several portions of water, the solution being decanted from the silica and undissolved calcium sulphate after each extraction. Three or four extractions, if properly carried out, will usually dissolve practically all the beryllium sulphate. All of the aluminum and much of the calcium sulphate will have also dissolved. It is of course undesirable to extract more thoroughly than is necessary to dissolve the beryllium sulphate, since the amount of calcium sulphate which enters the beryllium solution is then needlessly increased.

The extract is concentrated until it shows a density of about 1.31 at its boiling point. The calcium sulphate will then have been practically completely crystallized from the solution. The hot solution, decanted from the insoluble matter, is further concentrated to a density of 1.41 and allowed to cool and stand until the aluminum and beryllium sulphates have crystallized out. The mixed sulphates upon being dried and calcined give a mixture of beryllium and aluminum oxides which is quite free from all other materials. Any small amount of iron which may be present can be removed by treatment with dilute hydrochloric acid. If beryl is the raw material, the mixture of oxides obtained will contain about 60% alumina, the rest being beryllium oxide.

We have found that this mixture of oxides can be separated in a remarkably simple and easy manner by merely fusing it with a base capable of converting the alumina into an alkali-metal aluminate. Sodium carbonate or hydroxide are suitable. About 3 to 5 parts of the carbonate or hydroxide per part of the mixed oxide is a convenient proportion. The time required to convert the alumina to aluminate varies somewhat with the manner of calcining the mixed sulphates, but the separation is usually complete in about 1 to 3 hours. The beryllium oxide is unattacked during the treatment and is obtained in practically pure form by dissolving the melt and thoroughly washing the insoluble residue.

We claim:

1. Process of decomposing beryllium minerals which comprises heating the mineral with a flux including a calcium compound, adding sulphuric acid to the product so obtained, and dehydrating, dissolving the sulphate produced in water, evaporating to a density of about 1.31, and separating the precipitated calcium sulphate.

2. Process of decomposing beryllium minerals which comprises heating the mineral with about twice its weight of a mixture of about equal parts by weight of quicklime and calcium fluorid.

3. Process for the production of beryllium oxide which comprises calcining a mixture containing beryllium sulfate and aluminum sulfate, fusing the resulting oxides of aluminum and beryllium with sodium carbonate for a time sufficient to convert the aluminum oxide to sodium aluminate and extracting the melt with water.

4. Process of decomposing beryllium minerals which comprises heating the mineral with a flux including a calcium compound, adding sulphuric acid to the product so obtained, and dehydrating, dissolving the sulphate produced in water, evaporating to a density of about 1.31, separating the precipitated calcium sulphate, further concentrating the solution to a density of about 1.41 specific gravity and crystallizing beryllium and aluminum sulphates therefrom.

In testimony whereof, we affix our signatures.

ROBERT C. PRICE.
HUGH S. COOPER.